Oct. 6, 1936.  L. EIRICH ET AL  2,056,603
ROTARY CLOSURE FOR ORIFICES
Filed March 31, 1933   3 Sheets-Sheet 1

Inventors:
Ludwig Eirich
Joseph Eirich
By Sommers & Young
Attys.

Oct. 6, 1936.   L. EIRICH ET AL   2,056,603
ROTARY CLOSURE FOR ORIFICES
Filed March 31, 1933   3 Sheets-Sheet 2

Inventors:
Ludwig Eirich
Joseph Eirich
By Sommers & Young
Attys.

Oct. 6, 1936.  L. EIRICH ET AL  2,056,603
ROTARY CLOSURE FOR ORIFICES
Filed March 31, 1933  3 Sheets-Sheet 3
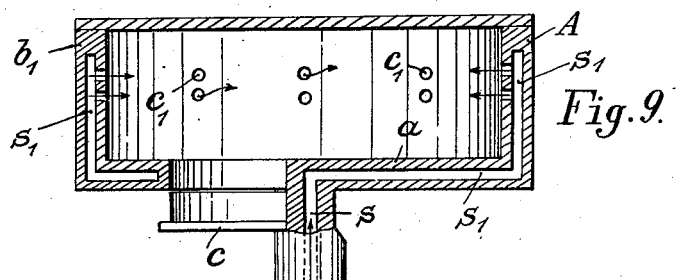
Fig. 9.
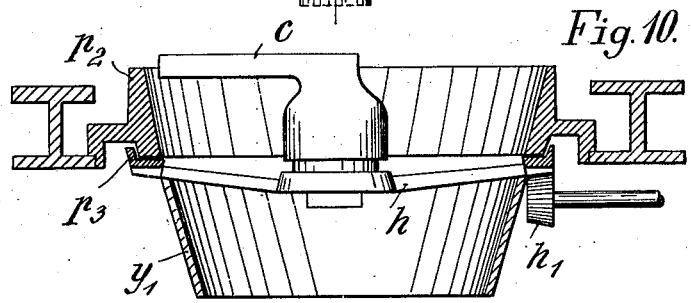
Fig. 10.
Fig. 12.  Fig. 11.
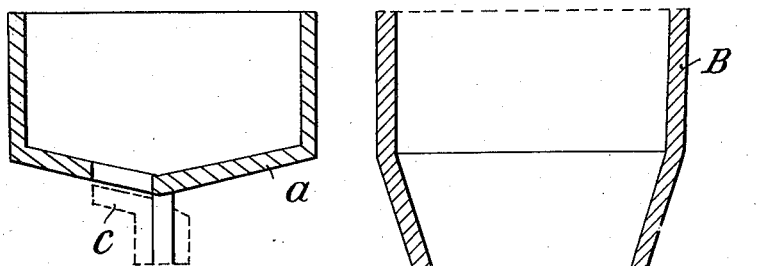
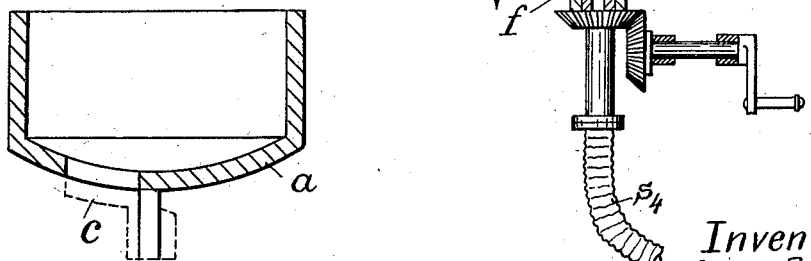
Fig. 13.
Inventors:
Ludwig Eirich
Joseph Eirich
By Sommers & Young
Attys Patented Oct. 6, 1936

2,056,603

UNITED STATES PATENT OFFICE 2,056,603

ROTARY CLOSURE FOR ORIFICES

Ludwig Eirich and Joseph Eirich,
Hardheim, Germany

Application March 31, 1933, Serial No. 663,810
In Germany April 16, 1932

10 Claims. (Cl. 220—33)

The invention relates to rotary shutter mechanism for the charging and discharging openings of the rotary and non-rotary containers used in machines for treating materials of all kinds, for example mixers, edge runner mills, roasting apparatus, silos and other storage containers for materials of all kinds, liquid, granular or in pieces, such as grain, meal, tar, asphalt, mortar, cement, gypsum, concrete and the like.

The shutter may be used with hot mixers and cold mixers. The treatments include amongst others the hot-mixing of tar, bitumen, fats, varnish and oil colors, pharmaceutical products, food-stuffs and the like, re-cooling in connection with chemical reactions, during the mixing process and drying materials in connection with stirring, mixing, kneading, disintegrating and so on.

The rotary shutter is applied to the floor of the container, which may be flat or otherwise, for example concave or coned. The shutter plate fits into the floor opening, from which it is removed by lowering, being then at once swung away and placed under the floor. Any material adhering to its top surface is thus scraped off. The shutter may be actuated by hand or by machinery.

The pivot on which the shutter turns, and on which it moves up and down, is fixed to the floor and has at the bottom a boss with an internal screw thread. This engages an externally screw threaded sleeve, which is rotated by means of a gear wheel or the like. When the shutter plate reaches its lowest position the boss bears on the flange of the sleeve and is thus coupled therewith. On further rotation the shutter is rotated with the sleeve and swung under the floor so that the material can pass out.

The floor and the fitting in the opening may be double walled so that there is a cavity, which may extend into the wall. This cavity communicates with the bore of the shutter pivot, through which a heating or cooling fluid may be introduced. Provision may be made for applying pressure or a partial vacuum in the container, by pumping, as for example for removing vapours due to chemical reactions or to a drying or roasting process.

In the case of silos for green food and the like the pipe for pumping in the material may be connected to the hollow pivot.

Several examples of construction of the closure are shown in Figs. 1 to 13, as applied for example to a mixing machine and a silo.

Fig. 9 is a vertical section of a hollow-walled mixing vessel.

Fig. 10 shows the throat bearing and bevel gearing, with the discharge nozzle, in vertical section.

Fig. 11 shows the lower part of a storage container with a rotary closure and perforated plug.

Fig. 12 shows a container with a coned bottom, and

Fig. 13 shows one with a concave bottom.

Figure 1:
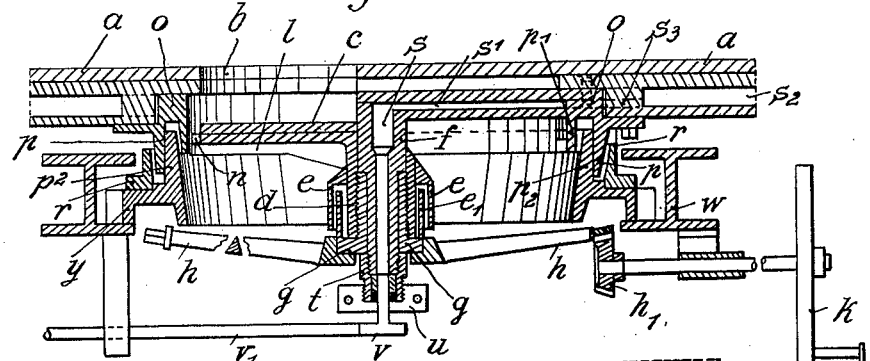
Fig. 1 is a vertical section through the flat bottom of a slowly rotating mixing vessel.
Figure 2:
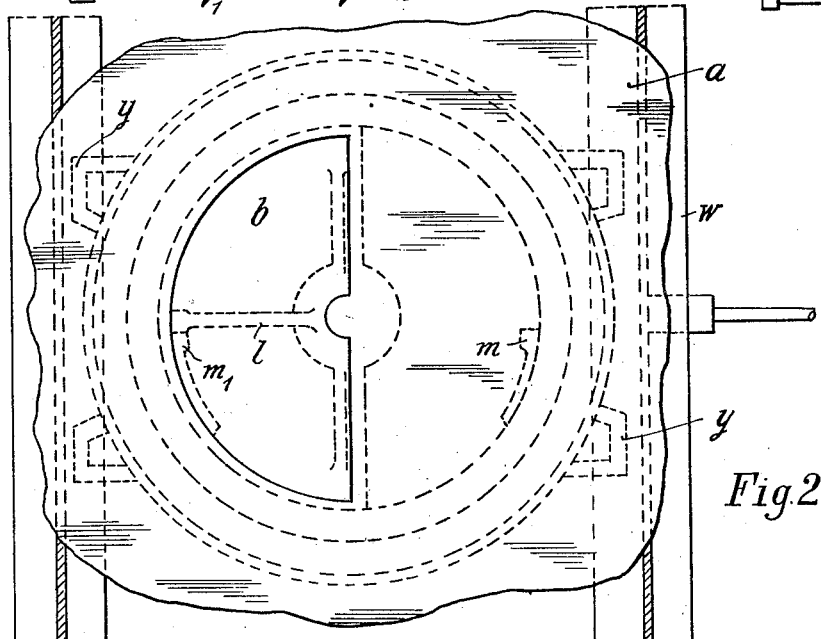
Fig. 2 is a plan view of Fig. 1.

According to Figs. 1 and 2 the floor $a$ of the mixing vessel has a semicircular discharge opening $b$, which can be closed by a plate $c$. The plate is shown in the lowered position, before being rotated about the pivot $f$. The plate has at the bottom a boss $d$ with an internal screw thread and can be rotated and moved up and down on the pin $f$ fixed to the floor $a$. On this pin there is a freely rotatable sleeve $g$ with an external screw thread and a flange, and this sleeve is fixed to a bevel gear wheel $h$. Around the boss $d$ are guards $e$, $e^1$ for the screw threads. The screw thread on the sleeve $g$ corresponds to that in the boss $d$. On rotation of the gear wheel $h$ by means of a hand crank $k$ and pinion $h^1$ the plate $c$ is raised or lowered. When the plate has been fully lowered and rotation of the crank continues the boss $d$ is pressed against the flange on the sleeve $g$, so that the plate is coupled with the sleeve and rotated till a rib $l$ on the plate strikes an abutment $m$ (Fig. 2). The opening $b$ is then exposed and the charge can pass out. By rotation of the crank $k$ in the opposite direction the plate $c$ is turned back till the rib $l$ strikes an abutment $m_1$. The plate is then exactly in register with the opening $b$, and when the crank is rotated further the plate is raised till it is flush with the floor $a$. The upward movement may be limited by a flange $n$ on the plate, which also serves to make a tight joint, but alternatively the movement may be limited by the boss $d$ striking the under surface of the floor $a$. A screw may be provided to serve as an adjustable abutment regulating the level.

In a circular opening there is an inserted member $o$ with the opening $b$ and pin $f$. At the lower part of the member $o$ there is a ring $p$ with an inside guard ring $p_1$. The ring $p$ works against the throat bearing $p_2$, which has feet $y$ resting on I-shaped supports $w$. Externally the bearing $p_2$ is surrounded by a ring $r$. The annular channel between $p_2$ and $r$ serves for oil.

The member $o$ has a cavity $s_1$ communicating with the hollow pin $f$. A heating or cooling fluid may flow through the bore $s$ and cavity $s_1$ to the cavity $s_2$, through ducts $s_3$. The sleeve $g$ and wheel $h$ are held by a stuffing box $t$ carried by a holder $u$. A T connection $v$ is mounted in the stuffing box $t$ and is connected to a tube $v_1$.

Figure 5:
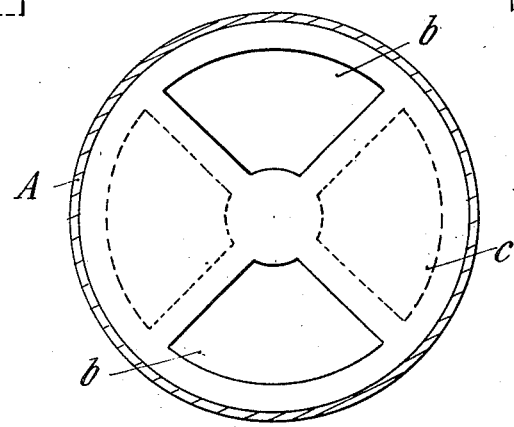
Fig. 5 is a plan view of a vessel with two quadrant shaped openings.
Figure 3:
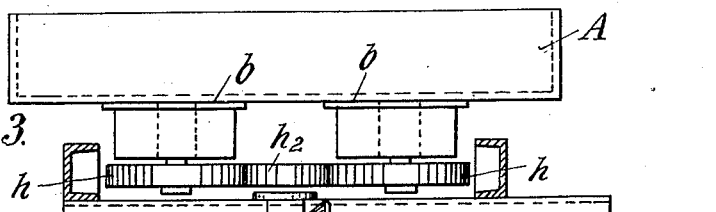
Fig. 3 shows a mixing machine with two semi-circular openings and closures.
Figure 4:
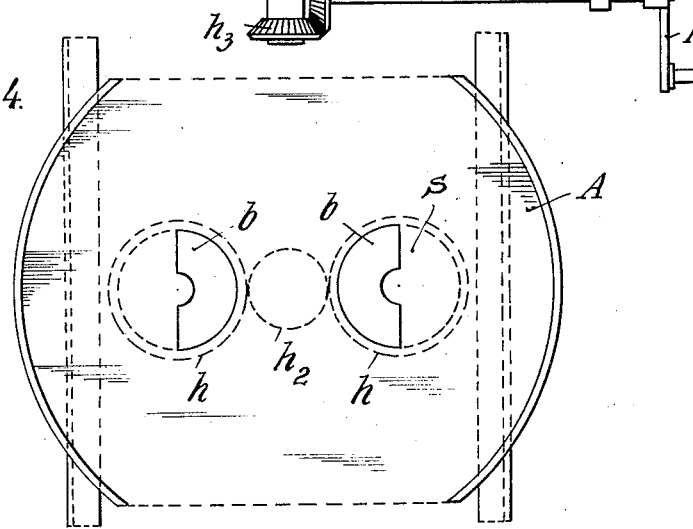
Fig. 4 is a plan view of Fig. 3.

Figs. 3 to 5 show other forms of construction with a plurality of openings in the floor of the container. In Figs. 3 and 4 there are two semicircular openings $b$, and in Fig. 5 there are two quadrant shaped openings opposite each other. Each supporting pivot has a gear wheel $h$ with a pinion $h_2$. In Figs. 3 and 4 the arrangements for rotation and vertical movement of the plate, viz pivot $f$, boss $d$ with screw thread, and screw thread sleeve $g$, are not shown in detail, as they are similar to the mechanism shown in Fig. 1. The gear wheels $h$ mesh with the pinion $h_2$, the axis of which is at the centre of the mixing bed A. By a crank $k$ or machinery and bevel gears $h_3$ the gear $h_2$, $h_1$, $h$ is driven and the two plates controlling the openings $b$ are thus both moved.

This mechanism just described may be applied to an edge runner mill with concentrically working runners, the bed having several plates $c$ for closing openings $b$.

Figure 6:
Fig. 6 is a plan view of a vessel with two circular openings and perforated closures.
Figures 7, 8:
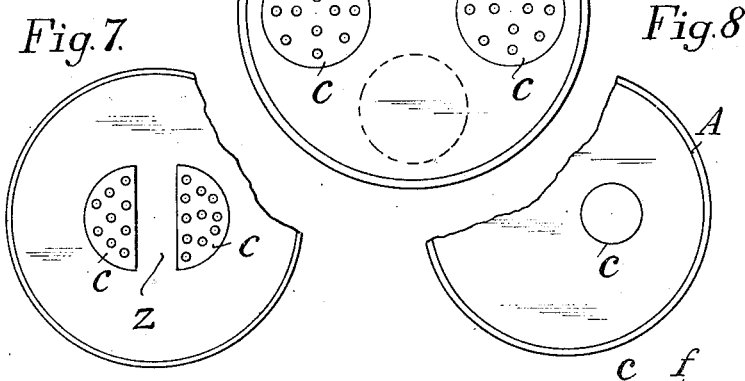
Fig. 7 shows diagrammatically a vessel with two semicircular openings and perforated closures.
Fig. 8 shows a mixing vessel with eccentric circular discharge openings and closures.
Figures 7A, 8A:
Fig. 7a is a cross-sectional view of the bottom of the vessel of Fig. 7.
Fig. 8a is a cross-sectional view of the bottom of the vessel of Fig. 8.

The plates $c$ may be perforated, as shown in Figs. 6 and 7. In Fig. 6 there are two openings opposite each other, with plates $c$, $c$ which are perforated and exchangeable. The plates may be actuated as in Fig. 3.

In Fig. 7 the pivot about which the two plates rotate and on which they move vertically is fixed to a transverse bridge piece $z$ between the two plates $c$, $c$.

As shown in Fig. 8 the pivot $f$ of the plate $c$ may be eccentric in relation to the bed. The closing mechanism (pivot, screw threads etc.) is similar to that shown in Fig. 1, but the bevel gear may be dispensed with. Instead of the large bevel wheel $h$ (Fig. 1) there is a hand wheel $w$. The part $x$ contains the internally screw threaded boss and the screw threaded sleeve. Owing to the low number of revolutions of the mixing vessel A the hand wheel $w$ is easy to turn while it is within reach of the person in charge of the apparatus, Fig. 9 shows a mixer A with a double or triple floor $a$ and wall $b_1$, the cavities in which communicate with each other. Inflow and outflow of cooling or heating fluid take place through the bore $s$ of the pivot. To enable suction or compression to be effected in the closed mixer A there are several nozzle-like openings $c_1$.

Fig. 10 shows the rim of the toothed wheel $h$ so constructed that it makes a nearly dust-tight joint at $p_3$ with the bottom edge of the throat bearing $p_2$. A hopper $y_1$ is fixed to the gear wheel for discharge of the material, and may have a bunker, vessel, bag or the like connected thereto by a tight joint.

Fig. 11 shows the rotary shutter $c$ applied to the floor of a stationary silo B. The bore $s$ of the pivot $f$ opens directly into the interior of the silo. The pipe $s_4$ for pumping in the grain through the floor of the silo is connected to the pivot $f$.

Figs. 12 and 13 show diagrammatically containers $a$ having respectively a coned bottom and a concave bottom to which the rotary shutter is applied.

We claim:

1. In combination with a container wall having an orifice, a pin extending from said wall adjacent said orifice, a closure plate corresponding in shape to the orifice, said plate having an eccentric opening surrounded by a boss, said opening slidably encompassing said pin, said boss being screw-threaded, a screw-threaded sleeve engaging the screw threads of the boss, and means for rotating said sleeve to vertically adjust the plate into and out of closing relation with the orifice and to swing the plate into and out of alignment with the orifice.

2. In combination with a container wall having an orifice, a pin extending from said wall adjacent said orifice, a closure plate corresponding in shape to the orifice, said plate having an eccentric opening surrounded by a boss, said opening slidably encompassing said pin, said boss being screw-threaded, a screw-threaded sleeve engaging the screw threads of the boss, means for rotating said sleeve to vertically adjust the plate into and out of closing relation with the orifice and to swing the plate into and out of alignment with the orifice, a stop fixedly connected with the container wall to position the plate in alignment with the orifice, and a second stop to position the plate out of alignment with the orifice.

3. In combination with a container wall having an orifice, a pin extending from said wall adjacent said orifice, a closure plate corresponding in shape to the orifice, said plate having an eccentric opening surrounded by a boss, said opening slidably encompassing said pin, said boss being screw-threaded, the pin being reduced at its end portion removed from the wall, a sleeve rotatably mounted on the reduced portion, said sleeve being externally screw-threaded and engaging the screw threads of the boss, and means for rotating said sleeve to vertically adjust the plate into and out of closing relation with the orifice and to swing the plate into and out of alignment with the orifice.

4. In combination with a container wall having an orifice, a pin extending from said wall adjacent said orifice, a closure plate corresponding in shape to the orifice, said plate having an eccentric opening surrounded by a boss, said opening slidably encompassing said pin, said boss being screw-threaded, a screw-threaded sleeve engaging the screw threads of the boss, means for rotating said sleeve to vertically adjust the plate into and out of closing relation with the orifice and to swing the plate into and out of alignment with the orifice, said means including a ring gear connected to said sleeve, and a drive pinion engaging the ring gear.

5. In combination with a container wall having an orifice, a pin extending from said wall adjacent said orifice, a closure plate corresponding in shape to the orifice, said plate having an eccentric opening surrounded by a boss, said opening slidably encompassing said pin, said boss being screw-threaded, a screw-threaded sleeve engaging the screw threads of the boss, means for rotating said sleeve to vertically adjust the plate into and out of closing relation with the orifice and to swing the plate into and out of alignment with the orifice, the wall of the container having a fluid conduit adjacent the opening, the pin being provided with a longitudinal bore connected with said conduit, and a pipe for temperature regulating fluid connected with the outer end of the pin bore.

6. In combination with a container wall having an orifice, a pin extending from said wall adjacent said orifice, a closure plate corresponding in shape to the orifice, said plate having an eccentric opening surrounded by a boss, said opening slidably encompassing said pin, said boss being screw-threaded, the pin being reduced at its end portion removed from the wall, a sleeve rotatably mounted on the reduced portion, said sleeve being externally screw-threaded and engaging the screw threads of the boss, a pair of telescopic interfitting guards surrounding the boss and sleeve to exclude extraneous matter from the threads, and means for rotating said sleeve to vertically adjust the plate into and out of closing relation with the orifice and to swing the plate into and out of alignment with the orifice.

7. In combination with a container wall having an orifice extending therethrough and a conduit formed therein adjacent the orifice, a pin extending from the wall adjacent the orifice, said pin having a longitudinal bore communicating with the conduit of the wall, the end portion of the pin removed from the wall being of reduced diameter, a plate corresponding in shape with the orifice and having an eccentric boss provided with a bore, said bore having an internally screw-threaded portion, said boss encompassing the pin, whereby the plate is pivotally mounted eccentrically of the orifice, a sleeve on the reduced portion of the pin having external screw threads engaging the screw threads of the boss, a ring gear mounted on said sleeve, a driving pinion engaging the ring gear, a pair of stops fixedly connected with the container wall for holding the plate in and out of alignment with the orifice, a pair of interfitting telescopic guards surrounding the sleeve and boss to exclude extraneous matter from the threads, and a pipe connected to the outer end of the bore of the pin.

8. In combination with a container having a plurality of adjacent orifices, a plurality of plates, one for each orifice each corresponding in shape to its orifice, means for moving each of said plates into and out of closing relation with its orifice and for aligning and disaligning the plates with their orifices, said means comprising a ring gear for each plate, a common drive pinion engaging all of said ring gears, and a crank for turning said pinion.

9. Apparatus according to claim 8 and in which the orifices and plates are semi-circular.

10. Apparatus according to claim 4 and a throat extending downwardly from the orifice and closure mechanism, the ring gear forming a tight connection with the lower end of the throat and being provided with a depending hopper forming an extension of said throat.

LUDWIG EIRICH.
JOSEPH EIRICH.